United States Patent Office 2,970,135
Patented Jan. 31, 1961

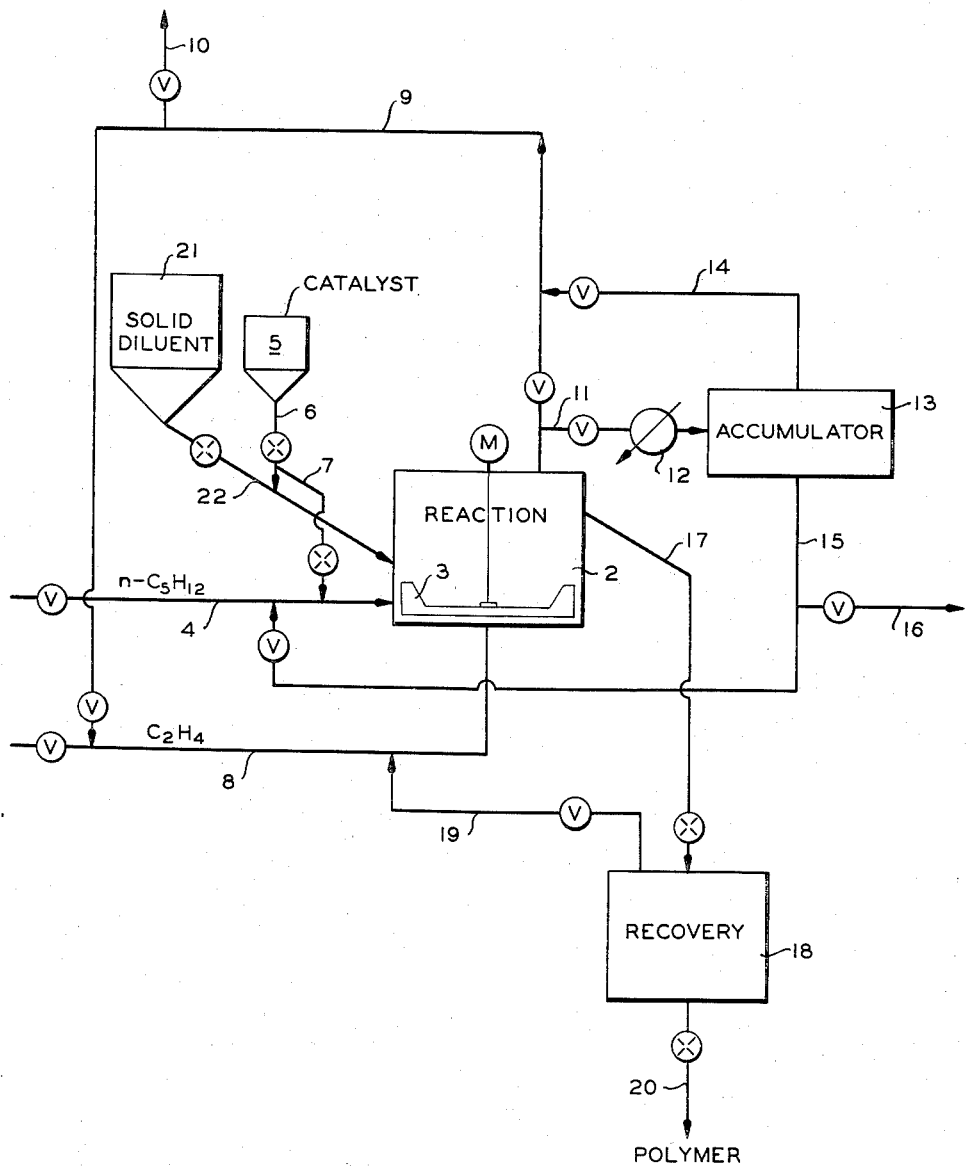

2,970,135

POLYMERIZATION PROCESS USING A SOLID CATALYST DISPERSION MEDIUM

William C. Lanning, John Paul Hogan, Robert L. Banks, and Clyde V. Detter, Bartlesville, Okla., assignors to Phillips Petroleum Company, a corporation of Delaware Filed Jan. 17, 1957, Ser. No. 634,754

17 Claims. (Cl. 260—94.9)

This invention relates to an improved process for the production of polymers. In one aspect, the invention relates to an improved process for initiating polymerization.

Prior to our invention, it had been found that unique and valuable polymers could be produced by contacting olefins, under polymerization conditions, with a catalyst comprising chromium oxide, in which at least part (preferably at least 0.1 weight percent of the total catalyst) of the chromium is preferably in the hexavalent state, associated with at least one oxide selected from the group consisting of silica, alumina, zirconia and thoria. The total chromium content of the catalyst is at least 0.1 weight percent and not more than 50 weight percent, preferably 1 to 30 weight percent, and more preferably 1 to 10 weight percent when ethylene is to be polymerized. The catalyst is preferably one which has been activated by heating at elevated temperatures up to about 1500° F. in a nonreducing atmosphere for a sufficient period of time to increase the polymerizing activity thereof.

Preferably, the activation is conducted in an atmosphere of substantially dry air or other oxygen-containing gas, e.g. having a dew point not greater than about 0° F. for a period in the range from 1 to 10 hours or more. The catalyst can be prepared by impregnating one of the above-mentioned oxides, e.g. a porous silica-alumina composite of the type known in the catalyst art, with an aqueous solution of a chromium compound which is calcinable to chromium oxide. Suitable chromium compounds include chrominum trioxide, chromic nitrate, chromic acetate, ammonium chromate, ammonium dichromate, and, less preferably, chromic sulfate or chromic chloride. The impregnated mass is dried, e.g. at temperatures up to about 300° F., and subsequently activated by heating as described. The activated catalyst is suitably maintained out of contact with poisons such as water, carbon monoxide, hydrogen, and most simple sulfur compounds. The olefins which are suitable as feed materials for this polymerization process comprise mainly cycloaliphatic and aliphatic olefins. Where it is desired to produce solid and semisolid polymers, the olefin is preferably an aliphatic 1-olefin containing not more than 8 carbon atoms per molecule. Where the olefin is a monoolefin, it is further preferred that there be no branching nearer the double bond than the 4-position. When the olefin is a conjugated diolefin, however, branching as close to the 1-double bond as the 3-position can be tolerated. When ethylene is the olefin, the product is a polyethylene characterized by high density and high crystallinity. These polyethylenes are valuable for the formation of molded articles, pipe, sheets, and films which can be utilized for food packaging. Since these polyethylenes have melting points of the order of 250° F. and higher they are quite suitable for the production of steam-sterilizable liquid containers and other utensils. The polymerization can be conducted at temperatures not exceeding 500° F. and preferably 150 to 450° F. The polymerization can be conducted at pressures from about atmospheric up to 1000 p.s.i. or higher, but is ordinarily conducted at pressures of the order of 100 to 700 p.s.i. It is sometimes desirable to utilize a diluent in the polymerization zone. This diluent can be a gaseous or a liquid hydrocarbon which is nondeleterious and inert under the polymerization conditions. Suitable hydrocarbons for this purpose are paraffinic and cycloparaffinic hydrocarbons. It is often advantageous to utilize sufficient pressure to maintain the diluent substantially in the liquid phase when the diluent contains 3 or more carbon atoms per molecule. Reaction time in the range 30 minutes to 10 hours is satisfactory, but not limiting.

It has further been found that the aforedescribed polymerization process is capable of producing extremely high yields of polyethylene in terms of parts by weight of polyethylene per part by weight of catalyst when the reaction is conducted in the gaseous phase at a temperature below the softening point of the product polyethylene. Copolymerization of ethylene with minor amounts of higher olefins such as propylene, 1-butene, 1-pentene, and 1,3-butadiene can also be effected under these conditions. However, it is highly desirable that the maximum amount of higher olefin not exceed 25 weight percent and preferable that it not exceed about 10 weight percent, based on total olefin. In this type of polymerization technique, the catalyst utilized can be present in the reactor in such small amounts that it is unnecessary to separate the catalyst from the product polymer. Additional advantages of gas-phase operation are: no diluent cost; cost of removing liquid diluent from the polymer is eliminated; no cost of diluent purification when no diluent is used.

We have discovered a highly advantageous and convenient technique for initiating and conducting the aforedescribed gas-phase reaction in a manner such that extremely small amounts of catalyst, e.g. down to 0.001 weight percent or less, based on total reactor contents, can be utilized efficiently and without initial loss of catalyst which sometimes results when it is attempted to utilize very small amounts of catalyst at the beginning of the reaction in a reactor provided with a mechanical stirrer. We have found that, in certain cases, when small amounts of catalyst are introduced into the polymerization reactor to initiate gas-phase polymerization, especially at gas flow rates too low to effect substantial fluidization in the reactor, the catalyst tends to adhere to the reactor walls and is not distributed throughout the reaction space by a mechanical stirrer. The result is that the reaction is effected, if at all, less efficiently than is desired.

According to our invention, a polymerization reaction of the type hereinbefore described is conducted by maintaining the catalyst dispersed in a solid dispersion medium throughout the catalytic contacting.

We have found that, if the reaction is initiated and continued with the catalyst in the form of a dispersion in a solid dispersion medium or parting agent, the catalyst can be dispersed properly through the entire reaction space, or an appreciable portion thereof, by means of a mechanical stirrer, even though the amount of catalyst present is insufficient to be dispersed by such a mechanical stirrer when present alone. The solid dispersion medium can be any material, organic or inorganic, which is solid, inert, and nondeleterious under the polymerization conditions. In one embodiment, the dispersion medium can be a solid polymer of the type formed in the reaction, e.g. a polyethylene of the type obtained as product in the polymerization herein described. In another embodiment, the dispersion medium can be a silica-alumina composite, e.g. in gel form, such as that utilized to prepare the catalyst but, when utilized as the dispersion medium, initially unpromoted with chromium oxide. Other dispersion media within the scope of the invention are zirconia, thoria, alumina, and silica. These can suitably be used in the porous or gel form. However, it is not absolutely essential that they be used in such form nor that they be catalytically active, alone or in admixture with other materials. For example, ground quartz can be satisfactorily utilized. Other suitable dispersion media include acid-treated clays, bauxite, Alundum, and feldspar. Once the reaction is well under way, it is often preferred to cease adding extraneous dispersion medium, since the catalyst is then in a state of dispersion through the product polymer, which acts as a dispersion medium.

The amount of dispersion medium utilized can vary over a wide range and ordinarily depends on the specific design of the reactor utilized. The important feature appears to be the obtaining of sufficient bulk of solid material containing the catalyst to enable the stirring or agitation means to take hold of the dispersed catalyst and effect agitation or distribution thereof. As a general rule, the amount of solid dispersion medium used should be at least five times the amount of catalyst present and can range to as high as 1000 times the amount of catalyst and higher. As a practical matter, these amounts are on a weight basis, especially where the density of the dispersion medium is roughly comparable with that of the catalyst. However, it will be apparent to those skilled in the art, from the foregoing discussion, that the important factor is really bulk or volume and this must be taken into consideration where the dispersion medium has a density which differs greatly from that of the catalyst. However, as will be apparent from the foregoing description the materials which are ordinarily preferred as dispersion media are materials which have densities generally comparable with the density of the catalyst.

The accompanying drawing illustrates several advantageous embodiments of our invention. In the drawing, a reaction zone or vessel is indicated by the numeral 2 and is provided with a mechanical agitation or stirring device 3 driven by a motor M. Since the polymerization is exothermic, cooling means, not shown, are usually provided in conjunction with the reactor. In one embodiment of the invention, normal pentane is supplied to the reactor through inlet 4. Catalyst is supplied from storage means 5 through conduits 6 and 7 and is suspended in the liquid normal pentane which is supplied to reactor 2 through inlet 4. The catalyst can be, for example, one which is prepared by impregnating a coprecipitated silica-alumina gel having a silica to alumina weight ratio of approximately 9 to 1 with a 1-molar aqueous solution of chromium trioxide, drying, and heating at approximately 950° F. for about 5 hours in a stream of substantially anhydrous air. The catalyst can be used in any particle size which will enable it to be efficiently agitated by means of an ordinary mechanical agitator. A suitable particle size range is from about 20 mesh to about 1 micron. Microspheroidal particles (e.g. 60–70 microns) are often preferred. A suspension of the catalyst in normal pentane is maintained in reactor 2 by means of stirrer 3 and ethylene is continuously supplied to the reactor through inlet 8. The reactor can be maintained at a temperature in the range 100 to about 230° F. and a pressure sufficient to maintain the normal pentane in the liquid phase, e.g. from about 100 to about 500 p.s.i. Under these conditions, the polymer which is formed is maintained as a particulate, mobile, non-agglutinative mass in the reactor and the catalyst is evenly dispersed through the polymer. Thus the dispersion medium is the polymer which is formed in situ while the catalyst is maintained as a suspension or slurry. The concentration of catalyst in the reactor contents is preferably maintained within the range 0.001 to 1 weight percent. The fluid materials supplied to the reactor are preferably supplied at such a linear velocity that they effect substantially no transport of catalyst out of the reactor and preferably at a velocity below that required for substantial effective fluidization of the particulate solids in the reaction zone. Thus it is preferred that most of the agitation be accomplished mechanically by stirrer 3. The gaseous effluent is withdrawn from the reactor through conduit 9 and recycled to conduit 8. This effluent can be diverted through conduit 11 and condenser 12 to condense any accompanying normal pentane, which is separated from the remaining gas in accumulator 13 and recycled through conduit 15. The recovered gas stream is recycled through conduits 14, 9 and 8.

When the volume of solid polymer with catalyst dispersed therethrough has attained the desired value in reactor 2, the supply of normal pentane added through inlet 4 is terminated. The presence of such a volume of polymer in the reactor can be detected by means of an effluent line 17 which connects to the reactor at any desired level which can be predetermined as that level of solid polymer which it is desired to remain in the reactor for efficient agitation. Thus when a sufficient volume of polymer accumulates in reaction vessel 2, it will overflow into standpipe 17 and the presence of this polymer in the standpipe can be taken as an indication that a sufficient volume of polymer for use as a dispersion medium has been reached. Other means known in the art to measure solids volume or depth can be used. At this point, the supply of normal pentane is terminated and the normal pentane remaining in reactor 2 can be removed therefrom by vaporization through outlet line 9 and diverted entirely through conduit 11, condenser 12, and accumulator 13, the uncondensed gas being recycled through conduits 14, 9, and 8. The recovered condensed pentane in accumulator 13 can then be withdrawn through conduits 15 and 16 to suitable storage means and the recycle through line 15 terminated. The polymerization in reaction zone 2 is then continued in the gaseous phase, and the conditions of polymerization can be maintained substantially as previously described except that no liquid diluent need be present. Catalyst can be continuously supplied for make-up purposes from storage 5, conduit 6, and conduit 22 or through conduits 7 and 4. Dispersion of the small amount of catalyst throughout the reaction zone is now readily maintainable because of the continuous presence of an appreciable volume of particulate solid polymer in the reaction zone. Unreacted gas is recycled through conduit 9 as before and any portion thereof can be removed from outlet 10 for the purpose of preventing the build-up of inerts in the system. Particulate polymer which accumulates in the reaction zone can be withdrawn through standpipe 17 to recovery zone 18 which can be, for example, a cyclone separator, the recovered gas being recycled through conduits 19 and 8 and the product polymer being recovered through conduit 20. This polymer can be treated for the removal of catalyst, for example, by dissolving the polymer or a fraction thereof in a suitable solvent such as toluene or xylenes and filtration of the mixture to remove undissolved catalyst. Any other suitable method of removing the catalyst can be utilized. However, the amount of catalyst in the polymer is less than 1 percent, and usually less than 0.1 percent, and therefore need not be removed in many cases.

According to another embodiment of the invention, illustrated in the drawing, a solid diluent such as preformed particulate polyethylene of the type produced in reaction zone 2 or silica-alumina unpromoted with chromium oxide can be supplied from storage 21 through conduit 22, catalyst being added in the desired proportion through conduit 6. The desired proportioning can be effected by methods known in the art, for instance, by the use of star valves in lines 6 and 22, as indicated in the drawing. Thus catalyst dispersed in an inert solid is supplied directly to the reactor. As the amount of polymer formed in the reaction increases, the addition of solid diluent from storage 21 can be discontinued. In other respects, the reaction is conducted as previously discussed.

As illustrated in the drawing, the technique of this invention can be utilized to initiate a polymerization reaction conducted in the gaseous phase where very small amounts of catalyst are utilized and especially where the reaction is conducted at non-fluidizing velocities in the reaction zone. The invention is particularly applicable to such a polymerization technique where temperature in the reaction zone is maintained below the softening point of the product polymer. In the case of polyethylenes of the type herein described, the maximum temperature is of the order of about 250° F. It will be appreciated by those skilled in the art that the softening point will vary depending upon the particular conditions and environment in the reactor. Copolymers of ethylene and higher olefins previously described herein, generally have softening points below that of ethylene homopolymers, and this fact must be taken into consideration when copolymers are being produced. Liquid diluent utilized for initiation of the reaction also affects the softening point of the polymer, since these diluents have a plasticizing action on the polyethylene at only moderately elevated temperatures. Thus where the polymer being produced is a homopolymer of ethylene and the diluent used in initiating the reaction is a paraffinic diluent such as propane, butane, and pentane, the maximum temperature utilized during initiation of the reaction is approximately 230° F. The temperature is correspondingly lower when a copolymer is being produced. When the diluent used in the initiation of the reaction is a cycloparaffin such as cyclopentane, methylcyclopentane or cyclohexane, the maximum temperature in the reaction zone during the initiation is about 190° F., since cycloparaffins exhibit a somewhat greater solvent power toward the polymer than do open-chain paraffins.

When the initiation is conducted by the use of a liquid diluent and formation of polyethylene in situ in suspension in said diluent, suitable diluents are paraffins and cycloparaffins having from 3 to 12 carbon atoms per molecule. A preferred class of diluent comprises paraffins and cycloparaffins having from 3 to 6 carbon atoms per molecule, since these are readily removable from the reactor by vaporization as discussed in connection with the drawing. However, the method of the invention is not limited to these diluents or to vaporization of the diluent. Thus, for example, the diluent can be drained from the solids in the reactor through a screen or a filter or merely decanted. However, vaporization as described is often preferred on account of its convenience, since it can be readily accomplished continuously without any interruption of polymer production.

EXAMPLE I

The catalyst utilized in this example was prepared from a commercial silica-alumina gel containing approximately 87 weight percent silica and 13 weight percent alumina. This gel has been prepared by precipitating alumina from an aqueous aluminum sulfate upon the surface by previously precipitated silica gel. This gel was impregnated with approximately a 0.26-molar aqueous solution of chromium trioxide, dried at temperatures up to 300° F., and activated by heating in a stream of air (dew point below 0° F.) for 5 hours at 1100° F. The final catalyst contained 1.7 weight percent chromium of which more than 50 percent was in the hexavalent state.

The reactor utilized had a capacity of one liter, and was provided with a mechanical stirrer driven by a motor. A suspension of 0.28 gram of the catalyst in 150 grams of normal pentane was introduced into the reactor, and the stirrer was started. The normal pentane had previously been treated with hydrogen in the presence of a hydrogenation catalyst to remove poisons such as sulfur. The reactor was maintained at 220° F. and 450 p.s.i.g. Ethylene was supplied to the reactor for several minutes and, at the end of 30 minutes, the pentane was completely removed from the system by flashing to atmospheric pressure. The reaction was then continued in the absence of pentane at the conditions already described. Polymer was removed from the reactor from time to time. The data obtained are shown in the following table.

*Operation of dry reactor*
[Operation at 450 p.s.i.g. and 220° F.]

| Cumulative Hours | Catalyst in Reactor, grams | Polymer in Reactor,[1] grams | Polymer Removed, grams | Yield,[2] grams/ gram | Viscosity Molecular Weight[3] | Modified Melt Index[4] |
|---|---|---|---|---|---|---|
| ½ | 0.28 | | (Removed pentane only) | | | |
| 0–1 | 0.28 | 0–109 | 22 | 390 | 90,000 | 1.3 |
| 1–1½ | 0.22 | 87–242 | 78 | 1,100 | 102,000 | 0.70 |
| 1½–2½ | 0.15 | 164–210 | 49 | 1,400 | 110,000 | 0.63 |
| 2½–4½ | 0.12 | 161–225 | 130 | 2,200 | 116,000 | 0.63 |
| 4½–7½ | 0.06 | 125–380 | 93 | 6,500 | 103,000 | 0.71 |
| 7½–8½ | 0.05 | 287–297 | (Down overnight) | | | |
| 8½–8¾ | 0.05 | 297–297 | | | | |
| 8¾ | 0.26 | (Added 0.21 gram fresh catalyst) | | | | |
| 8¾–10½ | 0.26 | 227–292 | 55 | 1,700 | 119,000 | 0.66 |
| 10½–13¼ | | 237–361 | 109 | 3,200 | 120,000 | 0.67 |
| 13¼–15 | 0.16 | 252–313 | 313 | | 111,000 | 0.78 |

[1] Calculated from ash analysis on polymer removed.
[2] Yield from catalyst remaining in reactor, based on ash content of product polymer.
[3] 24,500 × inherent viscosity determined with a solution of 0.2 gram polymer in 50 cc. tetralin at 130° C. See Kemp and Peters, Ind. Eng. Chem. 35, 1108 (1943); Dienes & Klemm, J. App. Phys. 17, 458 (1946).
[4] ASTM method D-1238-52T, except that 10 times the normal load (force of extrusion) was used.

The foregoing data illustrate the efficient production of high-grade polyethylene by the process of this invention. It should be noted that extremely high yields (grams polymer per gram catalyst) were obtained.

EXAMPLE II

In a further run, 0.16 gram of catalyst prepared as described in Example I, but having a total chromium content of 2.01 weight percent, and 1.3 grams of the unpromoted silica-alumina composite described in Example I were charged to the reactor described in Example I. The reactor was maintained at 210° F. Ethylene was added until the pressure reached 450 p.s.i.g. and the addition of ethylene was continued at this pressure. The reaction was continued for 1¾ hours. A total of 18.7 grams of polyethylene was recovered from the reactor. This amounts to a yield of 117 parts by weight of polymer per part by weight of catalyst.

The foregoing run was repeated except that 0.45 gram of catalyst was used and no silica-alumina was added. The reaction was continued for 1½ hours. A small amount of polyethylene was produced and this polymer together with the catalyst adhered to the upper parts of the reactor walls.

A comparison with the above runs shows the superior results obtained by the reaction initiation process of our invention.

A similar run was conducted except that 0.17 gram of catalyst and 1.5 grams of silica-alumina were utilized. This run was conducted at 210° F. and 450 p.s.i.g. for a period of three hours. A total of 57 grams of polyethylene was recovered. This amounts to a yield of 335 parts by weight of polymer per part by weight of catalyst.

EXAMPLE III

To the reactor described in Example I was charged 101.9 grams of polyethylene produced in Example I and 0.27 gram of the fresh catalyst described in Example I. Ethylene was supplied to the reactor for 2½ hours at 220° F. and 450 p.s.i.g. A total of 182 grams of polymer was recovered. This was a net production of 80 grams of polymer or a yield of 296 parts by weight of polymer per part by weight of catalyst.

This example illustrates that preformed polymer can be utilized as the catalyst dispersion medium according to this invention. It should also be noted that the run corresponding to the last three lines of data in the table in Example I also represent catalyst dispersion by means of polymer already formed in the reactor.

Although certain compositions, structures, examples, and process steps have been described for purposes of illustration it is believed clear that the invention is not limited thereto. Thus, although the invention has been described with particular reference to stirring as a method of agitation or mixing, other methods such as tumbling or rolling of the catalyst, as in a rotary kiln-type reactor or a rocking container, can be used.

We claim:

1. In a process for producing solid polymer which comprises contacting ethylene in the gaseous phase with a mobile particulate polymerization catalyst comprising chromium oxide, in which at least part of the chromium is hexavalent, supported on at least one oxide selected from the group consisting of silica, alumina, zirconia and thoria, said contacting occurring in a polymerization zone at a polymerization temperature below the softening point of said polymer and with the ethylene at a substantially non-fluidizing flow velocity and the concentration of catalyst in said polymerization zone being so low as to initially preclude distribution thereof through said polymerization zone by mechanical mixing, the improvement which comprises initially forming in said polymerization zone a particulate olefin polymer which is solid and non-tacky at said polymerization temperature; and agitating said catalyst so as to maintain same dispersed in said particulate olefin polymer during said contacting of ethylene in the gaseous phase with said catalyst.

2. A process according to claim 1 in which said olefin polymer is a polyethylene.

3. A process according to claim 1 wherein said olefin polymer is a polyethylene produced under the polymerization conditions set forth in claim 1.

4. In a process for producing solid polymer which comprises contacting ethylene in the gaseous phase with a mobile particulate polymerization catalyst comprising chromium oxide, in which at least part of the chromium is hexavalent, associated with at least one oxide selected from the group consisting of silica, alumina, zirconia and thoria, said contacting occurring in a polymerization zone at a polymerization temperature below the softening point of said polymer and with the ethylene at a substantially non-fluidizing flow velocity and the concentration of catalyst in said polymerization zone being so low as to initially preclude distribution thereof through said polymerization zone by mechanical mixing in the absence of a catalyst dispersion medium, the improvement which comprises establishing in said polymerization zone a solid dispersion medium in addition to said catalyst and initially unpromoted with chromium oxide; and agitating said catalyst so as to maintain same dispersed in said solid medium and through said polymerization zone during said contacting of ethylene in the gaseous phase with said catalyst.

5. A process according to claim 4 wherein said solid dispersion medium is substantially inert under the reaction conditions.

6. A process according to claim 4 wherein said solid dispersion medium is an inert inorganic solid.

7. A process according to claim 4 wherein said solid dispersion medium is a silica-alumina composite initially unpromoted with chromium oxide.

8. A process according to claim 4 wherein said solid dispersion medium is zirconia initially unpromoted with chromium oxide.

9. A process according to claim 4 wherein said solid dispersion medium is thoria initially unpromoted with chromium oxide.

10. A process according to claim 4 wherein said solid dispersion medium is alumina initially unpromoted with chromium oxide.

11. A process according to claim 4 wherein said solid dispersion medium is silica initially unpromoted with chromium oxide.

12. A process according to claim 4 wherein the catalyst concentration in the reaction zone is within the range 0.001 to 1 weight percent.

13. In a process for producing solid polymer which comprises contacting in a polymerization zone in the gaseous phase an olefinic feed selected from the group consisting of ethylene and mixtures of ethylene with minor amounts of a higher olefin copolymerizable with ethylene with a particulate mobile solid polymerization catalyst comprising chromium oxide, in which at least part of the chromium is hexavalent, supported on at least one oxide selected from the group consisting of silica, alumina, zirconia, and thoria, the contacting occurring at a temperature below the softening point of said polymer with the olefinic feed being at a substantially non-fluidizing flow velocity and the catalyst concentration in said polymerization zone being in the range of 0.001 to 1 weight percent, the improvement which comprises initially forming in said polymerization zone a suspension of said catalyst in a hydrocarbon, which is liquid, non-deleterious and inert under the polymerization conditions; contacting at least one olefin selected from the group consisting of ethylene and mixtures of ethylene with minor amounts of a higher olefin copolymerizable therewith with said suspension at a temperature which is at least 100° F. but below the softening point of said polymer, thereby forming a solid particulate, mobile, nonagglutinative mass of said polymer in said polymerization zone; continuing the contacting of said olefin with said catalyst in suspension in said hydrocarbon until sufficient of said polymer is formed as to allow mechanical mixing of said polymer and catalyst; removing said hydrocarbon from said polymerization zone; contacting in the gaseous phase in the absence of any liquid diluent said olefin with said catalyst while mechanically mixing the mixture of polymer and catalyst; and removing polymer from said polymerization zone.

14. A process according to claim 13 wherein said hydrocarbon is selected from the group consisting of open-chain paraffins and cycloparaffins having up to 6 carbon atoms per molecule.

15. In a process for producing solid polymer which comprises contacting in a polymerization zone in the gaseous phase ethylene with a particulate, mobile, solid polymerization catalyst comprising chromium oxide, in which at least part of the chromium is hexavalent, supported on at least one oxide selected from the group consisting of silica, alumina, zirconia and thoria, said catalyst having been activated by heating at elevated temperature in a non-reducing atmosphere, said contacting occurring at a temperature in the range of 150 to 230° F. and with the ethylene at a substantially non-fluidizing flow velocity and the concentration of catalyst in said polymerization zone being in the range of 0.001 to 1 weight percent, the improvement which comprises initially forming in said polymerization zone a suspension of said catalyst in a liquid, open chain paraffinic hydrocarbon having from 3 to 6 carbon atoms per molecule; contacting ethylene with said suspension at a temperature in the aforementioned range and at a pressure sufficient to maintain said hydrocarbon substantially in the liquid phase, thereby forming a solid, particulate, mobile, nonagglutinative mass of said polymer; continuing the contacting of said ethylene with said catalyst in suspension in said hydrocarbon until a sufficient volume of a mixture of said catalyst and said polymer is present to allow mechanical mixing thereof; vaporizing said hydrocarbon and removing same from said polymerization zone; contacting in the gaseous phase in the absence of said hydrocarbon ethylene with said catalyst while mechanically stirring the mixture of polymer and catalyst; and recovering polymer from said polymerization zone.

16. In a process for producing solid polymer which comprises contacting in a polymerization zone in the gaseous phase ethylene with a particulate, mobile, solid polymerization catalyst comprising chromium oxide, in which at least part of the chromium is hexavalent, supported on at least one oxide selected from the group consisting of silica, alumina, zirconia and thoria, said catalyst having been activated by heating at elevated temperature in a non-reducing atmosphere, said contacting occurring at a temperature in the range of 150 to 190° F. and with the ethylene at a substantially non-fluidizing flow velocity and the concentration of catalyst in said polymerization zone being in the range of 0.001 to 1 weight percent, the improvement which comprises initially forming in said polymerization zone a suspension of said catalyst in a cycloparaffinic hydrocarbon having from 5 to 6 carbon atoms per molecule; contacting ethylene with said suspension at a temperature in the aforementioned range and at a pressure sufficient to maintain said hydrocarbon substantially in the liquid phase, thereby forming a solid, particulate, mobile, nonagglutinative mass of said polymer; continuing the contacting of said ethylene with said catalyst in suspension in said hydrocarbon until a sufficient volume of a mixture of said catalyst and said polymer is present to allow mechanical mixing thereof; vaporizing said hydrocarbon and removing same from said polymerization zone; contacting in the gaseous phase in the absence of said hydrocarbon ethylene with said catalyst while mechanically stirring the mixture of polymer and catalyst; and recovering polymer from said polymerization zone.

17. In a process for producing solid polymer which comprises contacting in a polymerization zone in the gaseous phase ethylene with a particulate, mobile, solid polymerizing catalyst comprising chromium oxide, in which at least part of the chromium is hexavalent, supported on at least one oxide selected from the group consisting of silica, alumina, zirconia and thoria, said catalyst having been activated by heating at elevated temperature in a non-reducing atmosphere, said contacting occurring at a temperature in the range of 150 to 230° F. and with the ethylene at a substantially non-fluidizing flow velocity and the concentration of catalyst in said polymerization zone being in the range of 0.001 to 1 weight percent, the improvement which comprises initially forming in said polymerization zone a suspension of said catalyst in liquid, normal pentane; contacting ethylene with said suspension at a temperature in the aforementioned range and at a pressure sufficient to maintain said normal pentane substantially in the liquid phase, thereby forming a solid, particulate, mobile, nonagglutinative mass of said polymer; continuing the contacting of said ethylene with said catalyst in suspension in said normal pentane until a sufficient volume of a mixture of said catalyst and said polymer is present to allow mechanical mixing thereof; vaporizing said normal pentane and removing same from said polymerization zone; contacting ethylene in the gaseous phase with said catalyst in the absence of said normal pentane ethylene while mechanically stirring the mixture of polymer and catalyst; and recovering polymer from said polymerization zone.

References Cited in the file of this patent

UNITED STATES PATENTS

| | | |
|---|---|---|
| 2,449,489 | Larson | Sept. 14, 1948 |
| 2,692,259 | Peters | Oct. 19, 1954 |
| 2,825,721 | Hogan et al. | Mar. 4, 1958 |